US010594663B2

(12) United States Patent
Shah et al.

(10) Patent No.: US 10,594,663 B2
(45) Date of Patent: Mar. 17, 2020

(54) SYSTEM AND METHOD FOR COMPUTER BASED ASSESSMENT DISTRIBUTION AND PRINTING

(71) Applicant: Tata Consultancy Services Limited, Mumbai (IN)

(72) Inventors: Viral Prakash Shah, Mumbai (IN); Rakesh Ramesh Ahirrao, Mumbai (IN); Gaurav Singh, Mumbai (IN); Komal Rameshwar Balode, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 169 days.

(21) Appl. No.: 15/425,580

(22) Filed: Feb. 6, 2017

(65) Prior Publication Data

US 2018/0159829 A1 Jun. 7, 2018

(30) Foreign Application Priority Data

Dec. 1, 2016 (IN) .............................. 201621041143

(51) Int. Cl.
*H04L 29/06* (2006.01)
*G06Q 50/20* (2012.01)
(Continued)

(52) U.S. Cl.
CPC ... *H04L 63/0428* (2013.01); *G06Q 10/06398* (2013.01); *G06Q 50/20* (2013.01);
(Continued)

(58) Field of Classification Search
CPC ............. H04L 63/0428; H04L 63/0272; H04L 29/06659; H04L 12/40104; H04L 2463/041; G06Q 10/06398; G06Q 50/20; G06Q 15/02; G09B 7/00; G06K 15/02
See application file for complete search history.

(56) References Cited

U.S. PATENT DOCUMENTS 5,915,973 A 6/1999 Hoehn-Saric et al.
8,369,527 B2 * 2/2013 Carmeli .............. H04L 63/0428
380/277
(Continued)

FOREIGN PATENT DOCUMENTS

EP 2665029 A1 * 11/2013 ............. G09Q 90/00
WO WO 02/42963 A2 5/2002

OTHER PUBLICATIONS

Huszti, "A Secure Electronic Exam System", Informatka a felsöoktatásban, pp. 1-7, (2008).
(Continued)

*Primary Examiner* — Ali S Abyaneh
(74) *Attorney, Agent, or Firm* — Finnegan, Henderson, Farabow, Garrett & Dunner, LLP (57) ABSTRACT

This disclosure relates generally to computer based assessments, and more particularly to secured assessment distribution and printing. In one embodiment, the method includes mapping an assessment metadata with assessment conduction center (ACC) data to identify drive data having ACC location associated with candidates, count of candidates for each subject assessment, and subjects mapping with respective ACCs. The subjects are mapped with pre-stored content creator profile data to identify content creators capable of creating content for question papers corresponding to assessment subjects. The content for the question papers is bundled into distinct bundles that are encrypted with an encryption key based on schedule of assessment of assessment subject. The bundles are mapped with the drive data to identify bundles for respective ACCs and candidate profiles. The printing of respective questions papers is facilitated at respective ACC as per assessment schedule from the bundle for the respective ACC and the candidate profiles.

15 Claims, 3 Drawing Sheets

(51) Int. Cl.
*G06Q 10/06* (2012.01)
*G09B 7/00* (2006.01)
*G09B 5/08* (2006.01)
*G09B 5/06* (2006.01)
*G09B 7/02* (2006.01)

(52) U.S. Cl.
CPC .............. *G09B 5/06* (2013.01); *G09B 5/08* (2013.01); *G09B 7/00* (2013.01); *G09B 7/02* (2013.01); *H04L 63/0272* (2013.01)

(56) References Cited

U.S. PATENT DOCUMENTS

| | | | |
|---|---|---|---|
| 8,805,741 B2* | 8/2014 | Laverdiere-Papineau | G06F 21/6218 705/51 |
| 9,953,543 B2* | 4/2018 | Shah | G09B 7/00 |
| 2013/0137077 A1 | 5/2013 | Elangavan | |
| 2013/0203037 A1* | 8/2013 | Ramaswamy | G06Q 50/20 434/353 |
| 2017/0229033 A1* | 8/2017 | Saini | G06Q 10/10 |

OTHER PUBLICATIONS

Barik, "Risks and Remedies in E-Learning System", International Journal of Network Security & Its Applications (IJNSA), Academy & Industry Research Collaboration Center (AIRCC), vol. 4, No. 1, pp. 51-69 (2012).

\* cited by examiner

| DAY-SUBJECT MAPPING | | |
|---|---|---|
| A | B | C |
| DAY | SHIFT | SUBJECT ID |
| 17/01/2014 | 1 | 1 |
| 17/01/2014 | 1 | 2 |
| 17/01/2014 | 2 | 3 |

FIG. 3A

| SHIFT-SUBJECT MAPPING | | | | |
|---|---|---|---|---|
| A | B | C | D | E |
| DAY | SHIFT | SUBJECT ID | SUBJECT NAME | NO. OF SETS |
| 17/01/2014 | 1 | 1 | PHYSICS | 20 |
| 17/01/2014 | 1 | 2 | CHEMISTRY | 20 |
| 17/01/2014 | 2 | 3 | MATHS | 30 |

FIG. 3B

```
STATIC TEXT

GROUP 1                              100
1.  QUESTION 1                       100

SUB GROUP 1                          100
2.  QUESTION 2                       50

3.  QUESTION 3                       50
            ALL THE BEST
```

SYSTEM AND METHOD FOR COMPUTER BASED ASSESSMENT DISTRIBUTION AND PRINTING

PRIORITY CLAIM

This U.S. patent application claims priority under 35 U.S.C. § 119 to: India Application No. 201621041143, filed on Dec. 1, 2016. The entire contents of the aforementioned application are incorporated herein by reference.

TECHNICAL FIELD

This disclosure relates generally to computer based assessments, and more particularly to systems and methods for a secured computer based assessment distribution and printing.

BACKGROUND

Assessments or examinations are the most widely accepted standard procedures used today in almost all the environments, such as academic and corporate environment, to measure a candidate's skill and competency levels. Due to a higher cost and complexity of traditional paper based assessments, computer based assessments, typically referred to as online assessments, have emerged as a popular and convenient method for administering and processing the assessments.

The general acceptability of computer based assessments in academic as well corporate sectors is mostly due to ease of use and reduced time and effort in conduction and evaluation of the assessments. However, increasing use of online assessment has given rise to a number of issues related to security and integrity of the assessment. Maintaining integrity of the assessment becomes even more burdensome when the assessment is conducted at a large scale at several distributed examination centres.

SUMMARY

Embodiments of the present disclosure present technological improvements as solutions to one or more of the above-mentioned technical problems recognized by the inventors in conventional systems. For example, in one embodiment, a computer-implemented method for administering a secured assessment by an assessment assistance system is provided. The method includes receiving, via one or more hardware processors, an assessment metadata associated with a plurality of candidates registered for a plurality of assessments. The assessment metadata includes candidate attributes, schedule information, and a first plurality of assessment conduction center attributes associated with the plurality of assessments. Further, the method includes mapping, via the one or more hardware processors, the assessment metadata with a prestored assessment conduction center data to identify at least a drive data. The prestored assessment conduction center data includes a second plurality of assessment conduction centers attributes associated with a plurality of assessment conduction centers, the drive data includes location information of the plurality of assessment conduction centers for each of the plurality of candidates, a set of candidates from amongst the plurality of candidates appearing for each subject assessment at respective assessment conduction centers, and a set of assessments from amongst the plurality of assessments mapping with respective assessment conduction centers. Furthermore, the method includes mapping, via the one or more hardware processors, the plurality of assessments with a prestored content creator profile data to identify a plurality of content creator profiles capable of creating content for a plurality of question papers corresponding to the plurality of assessments. Moreover, the method includes bundling, via the one or more hardware processors, the content for the plurality of question papers into a plurality of bundles. Each bundle of the plurality of bundles is distinct and is encrypted with an encryption key generated based on a schedule of the assessment of said subject. Additionally, the method includes mapping, via the one or more hardware processors, the plurality of bundles with the drive data to identify one or more bundles from amongst the plurality of bundles corresponding to each of the plurality of assessment conduction centers and the plurality of candidates. Also, the method includes facilitating, via the one or more hardware processors, printing of the plurality of questions papers from the plurality of bundles at respective assessment conduction centers as per assessment schedule for the respective assessment conduction center and the respective candidates of the plurality of candidates.

In another embodiment, a computer-implemented system for administering a secured assessment is provided. The system includes at least one memory storing instructions and at least one processor coupled to said at least one memory. The at least one processor is configured by said instructions to receive assessment metadata associated with a plurality of candidates registered for a plurality of assessments. The assessment metadata includes candidate attributes, schedule information, and assessment conduction center attributes associated with the plurality of assessments. Further, the at least one processor is configured by said instructions to map the assessment metadata with a prestored assessment conduction center data to identify at least a drive data. The prestored assessment conduction center data includes a second plurality of assessment conduction centers attributes associated with a plurality of assessment conduction centers, the drive data includes location information of the plurality of assessment conduction centers for each of the plurality of candidates, a set of candidates from amongst the plurality of candidates appearing for each subject assessment at respective assessment conduction centers, and a set of assessments from amongst the plurality of assessments mapping with respective assessment conduction centers. Furthermore, the at least one processor is configured by said instructions to map the plurality of assessments with a prestored content creator profile data to identify a plurality of content creator profiles capable of creating content for a plurality of question papers corresponding to the plurality of assessments. Moreover, the at least one processor is configured by said instructions to bundle the content for the plurality of question papers into a plurality of bundles. Each bundle of the plurality of bundles is distinct and is encrypted with an encryption key generated based on a schedule of the assessment of said subject. Additionally, the at least one processor is configured by said instructions to map the plurality of bundles with the drive data to identify one or more bundles from amongst the plurality of bundles corresponding to each of the plurality of assessment conduction centers and the plurality of candidates.

In yet another embodiment, a non-transitory computer-readable medium having embodied thereon a computer program for executing a method for administering a secured assessment by an assessment assistance system is provided. The method includes receiving an assessment metadata associated with a plurality of candidates registered for a plurality of assessments. The assessment metadata includes candidate attributes, schedule information, and a first plurality of assessment conduction center attributes associated with the plurality of assessments. Further, the method includes mapping the assessment metadata with a prestored assessment conduction center data to identify at least a drive data, the prestored assessment conduction center data comprising a second plurality of assessment conduction centers attributes associated with a plurality of assessment conduction centers, the drive data includes location information of the plurality of assessment conduction centers for each of the plurality of candidates, a set of candidates from amongst the plurality of candidates appearing for each subject assessment at respective assessment conduction centers, and a set of assessments from amongst the plurality of assessments mapping with respective assessment conduction centers. Furthermore, the method includes mapping the plurality of assessments with a prestored content creator profile data to identify a plurality of content creator profiles capable of creating content for a plurality of question papers corresponding to the plurality of assessments. Moreover, the method includes bundling the content for the plurality of question papers into a plurality of bundles. Each bundle of the plurality of bundles is distinct and is encrypted with an encryption key generated based on a schedule of the assessment of said subject. Additionally, the method includes mapping the plurality of bundles with the drive data to identify one or more bundles from amongst the plurality of bundles corresponding to each of the plurality of assessment conduction centers and the plurality of candidates. Also, the method includes facilitating printing of the plurality of questions papers from the plurality of bundles at respective assessment conduction centers as per assessment schedule for the respective assessment conduction center and the respective candidates of the plurality of candidates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Currently, most widely used method of assessment includes offline paper creation and distribution to assessment conduction centres. An assessment conduction centre is a place where a plurality of aspirants gathers on a specific date and time as communicated by the assessment conduction centre to appear for the assessment. An assessment conduction centre may also be referred to as an exam centre. The exam centre provides the plurality of aspirants with requisite infrastructure for appearing for the assessments or examinations.

In existing method of conducting examinations or assessments, an in-charge of conducting assessment manages overall process of conducting the assessment. For example, the in-charge is responsible for preparing a time-table for examinations, maintaining correct candidate data, receiving and/or printing of question papers, ensuring secured exams at the exam centres and other such activities. In order to conduct the above mentioned activities, the in-charge needs a large workforce of skilled professionals capable of handling said activities in a secured manner.

For example, in order to create content of question papers for said assessment, skilled professionals (or question paper creator) in concerned technology and/or subjects may be required. Currently, the question paper creators share the assessment content, i.e., questions and correct answers, with the corresponding questions, and instructions pertaining to the assessment with an assessment assistance centre to enable the assessment assistance centre to conduct and evaluate the assessment on their behalf. The question paper having assessment content may be transferred from the assessment assistance centres to the assessment conduction centre before the day of examination. Mostly, the assessment content is transferred manually, thereby leading to major chances to leak question paper because of human interference.

Moreover currently, manual workforce is required for registering the candidates, maintaining candidate data, and managing overall examination conduction centres. Such an effort makes the process of conducting assessment cumbersome and time-consuming. Moreover, the manual interference may have mistakes such as incorrect candidate names, improper test centre address, errors in addresses, and improper question paper content, in addition to the concern of security of the question papers.

Once the question papers having the assessment content is delivered at the assessment conduction centers, the assessment conduction centers are responsible for generation of hall ticket and attendance sheet for the candidates appearing for the assessment at the respective assessment conduction centers. However, considering the each assessment center having number of candidates running into at least a couple of hundred, the generation of hall ticket and attendance sheet becomes a cumbersome process.

In the recent years, computer based assessment has emerged as a popular and widely adopted mode of conducting various academic and corporate assessments. Computer based assessment is generally a mode of assessment where questions appear on the screen of a computing system and aspirants submit their answers using an input device, such as keyboard and/or mouse. Such type of assessment offers significant advantages over traditional paper based assessments, like flexibility, agility, efficiency, reduced time in evaluation, and cost savings in printing, storage, and transportation of the question papers to distributed examination centres. The present disclosure relates to a system and method for computer based assessment distribution and printing in an efficient and a safe manner.

In accordance with the present subject matter, systems and methods are provided for computer based assessment, wherein the assessment can be conducted without sharing of actual content of the assessment, such as questions and their corresponding answers prior to the assessment schedule. The non-sharing of the actual content ensures security and integrity of the assessment.

In an embodiment, the creation of assessment content (or the question papers) can be done by authorized content creators (or authors). Such authorized content creators are selected automatically by the system based on the profiles of the content creators stored in the system (or accessible to the system), thereby minimizing any chance of leaking of question papers. In addition, the printing of the question papers can only be performed by authorized users and on the day of exam at the examination conduction centers, thereby negating chances of paper leak.

The above method(s) and system(s) are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 1:
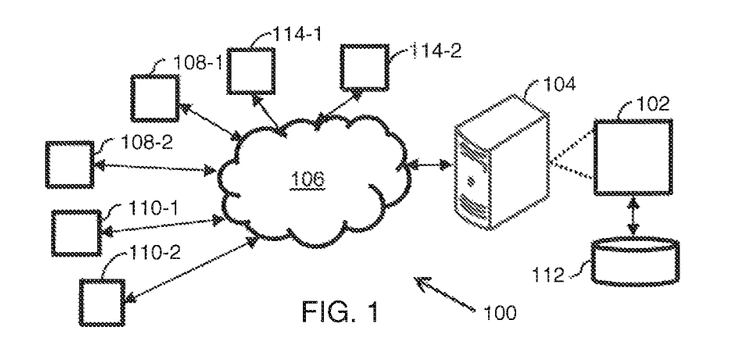
FIG. 1 illustrates an exemplary networking environment implementing a secured assessment system according to some embodiments of the present disclosure.

FIG. 1 illustrates a network environment 100 implementing a secured assessment assistance system 102, according to an embodiment of the present subject matter. The secured assessment assistance system 102, hereinafter referred to as the system 102, is configured for conducting a secured computer based assessment. The system 102 may be embodied in a computing device, for instance a computing device 104. In an implementation, the system 102 is implemented within an assessment assistance centre. Alternatively, the system 102 can be implemented outside of an assessment assistance centre. The assessment assistance centre can be an Information Technology (IT)/software firm or a specialized agency involved in such practice.

The system 102 is communicatively coupled, over a network 106, to user devices, for example machine 108-1. In an implementation the system 102 may be connected to the machine 108-1 over a secured Virtual Private Network (VPN). The machine 108-1 may be further connected to another user device, for example a machine 108-2 over a local area network (LAN). The machines 108-1, 108-2 enables users to provide registration details thereof for registering to the system 100. It is to be noted herein that the system 200 may enable in provisioning of a user interface, such as a graphic user interface (GUI), which may be used by the candidate for registration.

Further, the system 102 is communicatively coupled, over the network 106, to exam centre machines, such as an exam centre machines 110-1, 110-2 (hereinafter collectively referred to as exam centre machines 110) and so on. In an implementation, the exam centre machines 110 are implemented within an exam centre (or an assessment conduction centre). The assessment conduction centre, as mentioned earlier, may include an educational body, like schools and colleges, which conducts tests for admitting students, conducting examinations and hiring faculty, or a recruitment agency like a bank, a government body like public sector undertakings that conduct tests for hiring employees, promoting employees, appraisal purposes, and so on. It is to be understood that FIG. 1 depicts only two exam centre machines, for example, the machine 110-1, 110-2 for the ease of explanation; however, the same should not be construed as a limitation, and multiple machines may be deployed at the exam centre (or assessment conduction centres). In an embodiment, the machines 110-1, 110-2 at the assessment conduction centers may enable receipt of assessment content from content creators of the assessment via the assessment assistance center. In an embodiment, the machines 110-1, 110-2 may be configured as servers at the respective assessment conduction centers. The machines 110-1, 110-2 may further enable printing of question papers associated with the assessment at the respective assessment conduction centers in a secured manner. Herein, the content creators may provide the assessment content (or question papers) by utilizing machines such as machines 114-1, 114-2. The machines 114-1, 114-2 may be connected to the system 200 and the assessment conduction centers through the network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
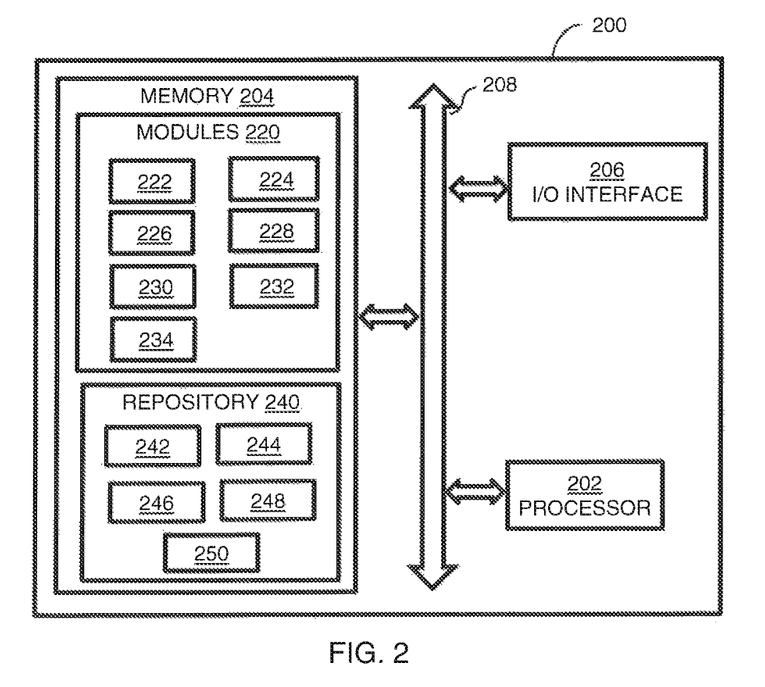
FIG. 2 is an example representation of a method for conducting a secured computer based assessment according to some embodiments of the present disclosure.

FIG. 2 illustrates a block diagram of an assessment assistance system 200, in accordance with an example embodiment. The assessment assistance system 200 (hereinafter referred to as system 200) may be an example of the system 102 (FIG. 1). In an example embodiment, the system 200 may be embodied in, or is in direct communication with the system, for example the system 102 (FIG. 1). In an embodiment, the system facilitates in end-to-end conduction of examinations in a secured manner. The system 200 includes or is otherwise in communication with at least one processor such as a processor 202, at least one memory such as a memory 204, and an I/O interface 206. The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types. In one implementation, the modules 220 may include an assessment management module 222, a content creation module 224, a bundle mapping module 226, a candidate registration and authentication module 228 and other modules 230. The other modules 230 may include programs or coded instructions that supplement applications and functions of the system 200.

The repository 240, amongst other things, includes a system database 242 and other data 244. The other data 244 may include data generated as a result of the execution of one or more modules in the other modules 230. The repository 240 is further configured to maintain an assessment metadata 246, content creator profile data 248 and assessment content 250.

According to the present subject matter, the system 200 is configured to conduct a secured computer based assessment. In an embodiment, the system 200 receives assessment metadata associated with a plurality of candidates registered for a plurality of assessments. In an embodiment, the system 200 includes an assessment management module 222 for receiving the assessment metadata 246. The assessment metadata 246 may include candidate attributes, schedule information, and a first plurality of assessment conduction centre attributes associated with the plurality of assessments. Herein, the candidate attributes may include attributes such as candidate name, age, class/standard, family information, medical information and so on. In an implementation, a user may access the system 200 through the machines such as machines 108-1 for the purpose of registering for the secured assessment. For the purposes of the description herein, the user may be understood as a candidate willing to register for one or more examinations. Also, the machine 108-1 may be understood as machines accessible to the candidates. In an embodiment, the candidates may have necessary credentials and access to the system 200. In an embodiment, the system 200 may enable in provisioning of a user interface, such as a graphic user interface (GUI), which may be used by the candidate for the purposes of registering with the system 200.

In an embodiment, the first plurality of assessment conduction center attributes may include the requisite attributes of the assessment conduction center that may be preferred by the candidate. For instance, the requisite attributes may include location, capacity, availability of certain facilities in the examination center (for example, the exam centre should have arrangements for commutation of handicapped candidates, and so on). In an embodiment, the assessment conduction center attributes may be prestored in the system 200 as assessment metadata 246, and obtained from the system 200.

In an embodiment, the schedule information may include information associated with schedule of one or more assessments for which the plurality of candidates have registered. For instance, the schedule information may include the start date and/or end date of various exams being conducted, number of exam shifts per day, subjects, courses, and so on. In an embodiment, the schedule information may be prestored in the system 200. For example, concerned personnel at the assessment assistance center may populate the schedule information in a template and upload the template to the memory of the system 200. In an embodiment, the assessment metadata may additionally include details of exam names, description of the examinations, exam conduction city details, language, course and subject mapping, number of shifts, and so on.

Herein, receipt of the assessment metadata includes the candidate attributes, the schedule information, and the first plurality of assessment conduction centre attributes associated with the plurality of assessments in the system may be referred to as 'assessment creation'. In an embodiment, during the assessment creation, a printer password may also be provided, so that the same printer password can be utilized for printing of question papers associated with the assessment at the respective assessment conduction centers.

Upon assessment creation, the system 200 is caused to map the assessment metadata with a prestored assessment conduction center data to identify at least a drive data. The assessment conduction center data may include a second plurality of assessment conduction centers attributes. The second plurality of assessment conduction centers attributes may include, but are not limited to, location, capacity, and availability of certain facilities in the examination/assessment conduction centers that are already registered with the system 200.

In an embodiment, the assessment management module 222 may identify the drive data based on the mapping of the assessment metadata with the prestored assessment conduction center data. Herein, the drive data may include assessment conduction center location information of the plurality of assessment conduction centers, a set of candidates appearing for each subject assessment at respective assessment conduction centers and a set of assessments mapping with said respective assessment conduction centers. Herein, the system 200 may be caused to map the assessment conduction center attributes with candidate attributes (including candidate preferences). For example, the assessment conduction center city (derived from assessment conduction center attributes) may be matched with candidate city preference (derived from candidate attributes). Also, the candidate attributes may indicate physical disability, and the exam assessment conduction center attribute may include a "physically disabled friendly" attribute. In this way, any assessment conduction center attribute can be compared with candidate attribute to identify the drive data.

Further, based on the mapping, the assessment management module 222 is configured to perform multiple functions associated with booking of assessment conduction centres for the plurality of candidates, booking of examination slots for said candidates, generation of hall tickets, and so on. Once the assessment metadata is created, the assessment management module 222 enables booking of exam centres (or assessment conduction centers). It will be noted that the system 200 is accessible over the network and hence the system 200 enables in booking of the exam centres from any machine connected to the network and residing in a given country, state and/or city. In an embodiment, the system 200 may enable in provisioning of a user interface, such as a graphic user interface (GUI), which may be used by the candidate for the purpose of accessing the assessment conduction center data stored in the repository 240. In an embodiment, the assessment conduction center data may include details such as location, capacity of test centres, and so on.

In an embodiment, the system 200 is caused to enable the candidates to book time slots for the respective assessments. The booking of time slots by the candidates may be referred to as slot booking. The slot booking may indicate which candidate has to give exam at which assessment conduction center of a city at a given time. In an embodiment, the machines such as the machine 108-1 (FIG. 1) may be understood as machine accessible to the candidates for enabling the candidates to book for respective assessments. In an embodiment, the candidates may have necessary credentials and access to the system 200. In an embodiment, the system 200 may enable in provisioning of a user interface, such as a graphic user interface (GUI), which may be used by the candidate for the purposes of registering with the system 200.

In an embodiment, the assessment management module 222 further enables generation of hall ticket and attendance sheet for the candidates based on the mapping. In an embodiment, the content in the hall ticket may include candidate name, roll number, exam conduction name and address, subject details and other relevant details. It will be noted that the content in the hall ticket is configurable and can be configured by an administrator of the assessment administering system 200.

In an embodiment, the system 200 is caused to map the plurality of subjects with a prestored content creator profile data 244 to identify a plurality of content creator profiles capable of creating content for a plurality of question papers corresponding to the plurality of subjects. In an embodiment, the content creator profile data 244 may be prestored at the system 200. The content creator profile data 244 may include attributes such as content creator specialization, total level of experience, a rating associated with the content creator, a language preference of the content creator and so on. In an example embodiment, the content creation module 224 may map the plurality of subjects with the pre-stored content creator profile data 244.

In an embodiment, the content creation module 224 may further enable in creation of question papers for various examinations. In an embodiment, the system 200 is capable of providing a UI for enabling content creators to access the content creation module 224 and create question papers. Further, the content creation module 224 enables in real-time modifications to the created question papers, for instance, adding, deleting and/or updating the content of question papers. In an embodiment, the content creation module 224 facilities in creating subjects which appear in the assessment management module 222 at the time of assessment creation. The content creation module 224 may enable the content authors to create question papers, which is in local instance, and accordingly the question paper names can be blocked so as to get question paper names unique. In an embodiment, the content creators (or authors) can block paper names either one by one or in bulk. An example of blocking the question paper names is described further with reference to FIGS. 3A-3C.

Upon blocking the question paper names, the content creators (or authors) may access a template of question paper, where the question papers may be associated with a name. In other words, a name may be associated/blocked for each of the question papers. In an embodiment, the question paper template with the blocked name may be in XML format. An example question paper template in XML format may be as follows:

```
<?xml version='1.0' encoding='UTF-8' ?>
<questionpaper quesPaperId="1" quesPaperName="QP1">
    <questionPaperMarks><![CDATA[100.0]]></questionPaperMarks>
<questionpapernumberofquestion><![CDATA[3]]></questionpapernumberofquestion>
        <questionpapernumberofimages><![CDATA[0]]></questionpapernumberofimages>
        <languages>
        <language id="1" name="English"/>
        </languages>
        <images/>
        <statictexts>
            <statictext groupid="0" sequenceNumber="1" internalSequenceNumber="0">
                <staticText><![CDATA[<table border="0" cellpadding="1" cellspacing="1"
style="width: 100%;">
<tbody>
```

-continued

```
                <tr>
                    <td>Static Text</td>
                </tr>
            </tbody>
        </table>]]></staticText>
            </statictext>
            <statictext groupid="0" sequenceNumber="3" internalSequenceNumber="0">
                <staticText><![CDATA[<table border="0" cellpadding="1" cellspacing="1" style="width: 100%;">
    <tbody>
        <tr>
        <td style="text-align: center;">All The Best</td>
            </tr>
    </tbody>
</table>]]></staticText>
            </statictext>
        </statictexts>
        <groups>
            <group id="1" sequenceNumber="2" internalSequenceNumber="0">
                <totalQuestions><![CDATA[2]]></totalQuestions>
                <maxQuestions><![CDATA[1]]></maxQuestions>
                <groupDisplayId><![CDATA[Group 1]]></groupDisplayId>
                <groupMarks><![CDATA[100.0]]></groupMarks>
                <subgroups>
                    <groupid><![CDATA[2]]></groupid>
                </subgroups>
                <name<><![CDATA[<table border="0" cellpadding="1" cellspacing="1"style="width: 100%;">
                    <tbody>
                    <tr>
                    <td>Group 1</td>
                    </tr>
                    </tbody>
</table>]]></name>
            </group>
            <group id="2" sequenceNumber="0" internalSequenceNumber="2">
                <totalQuestions><![CDATA[2]]></totalQuestions>
                <maxQuestions><![CDATA[1]]></maxQuestions>
                <groupDisplayId><![CDATA[SG1]]></groupDisplayId>
                <groupMarks><![CDATA[100.0]]></groupMarks>
                <subgroups/>
                <name><![CDATA[<table border="0" cellpadding="1" cellspacing="1" style="width: 100%;">
                    <tbody>
                        <tr>
                            <td>Sub Group 1</td>
                        </tr>
                    </tbody>
</table>]]></name>
            </group>
        </groups>
        <questionList>
            <question groupid="1" qid="1" quesNumber="1" langid="1" internalSequenceNumber="1">
                <questionText><![CDATA[Question 1]]></questionText>
                <marks><![CDATA[100.0]]></marks>
                <gradingScheme><![CDATA[NA]]></gradingScheme>
                <markingscheme/>
            </question>
            <question groupid="2" qid="2" quesNumber="2" langid="1" internalSequenceNumber="1">
                <questionText><![CDATA[Question 2]]></questionText>
                <marks><![CDATA[100.0]]></marks>
                <gradingScheme><![CDATA[NA]]></gradingScheme>
                <markingscheme/>
            </question>
            <question groupid="2" qid="3" quesNumber="3" langid="1" internalSequenceNumber="2">
                <questionText><![CDATA[Question 3]]></questionText>
                <marks><![CDATA[100.0]]></marks>
                <gradingScheme><![CDATA[NA]]></gradingScheme>
                <markingscheme/>
            </question>
        </questionList>
</questionpaper>
```

In an embodiment, the system 200 allows the content creators to generate question paper in the format defined by the question paper template. An example of the question paper generated is described in FIG. 3C. Herein, it will be noted that the question papers are created in the local instance by the plurality of content creator, and hence the question papers are highly secure since these are not connected to the network.

The question papers can be further used to create bundles of the question papers. In an embodiment, the content creation module 224 facilitates in creation of bundles of the questions papers that can be transmitted to respective test centers/assessment conduction centers. In an embodiment, the system 200 may be caused to create bundles of the question papers based on the mapping. For example, based on the mapping, the system 200 may determine that the schedules (dates-shifts) corresponding to each assessment subject. Herein, since the content of question papers is stored in the local instance or local systems of the content creators, mapping of schedules of the assessment subjects with the assessment subjects may enable in bundling of the question papers. An example of bundling of the schedule-assessment subject mapping is described further with reference to FIGS. 3A-3C.

In an embodiment, the content creation module 224 may further be caused to encrypt and password protect the bundles of the question paper. In an embodiment, the system 200 may be caused to encrypt the question paper, for example with an extension as igx. In an embodiment, the system 200 may be caused to utilize an Advanced Encryption Standard (AES) model for encrypting the question paper. The design and strength of all key lengths of the AES algorithm may be sufficient to protect classified information up to the secret level. For example a 256 bit AES encryption may be utilized for blocking the question paper. In an embodiment, each bundle may be distinct and encrypted with an encryption key based on the schedule of the assessment of said subject. It will be noted that the bundles of the question papers may be encrypted with suitable encryption models, not limiting to the algorithms described herein. Other examples of the encryption algorithm may include, but are not limited to RSA, Data Encryption Standard (DES), and so on.

Password protected encrypted bundles of the question paper, which is henceforth referred to as a protected examination paper, are distributed to several assessment conduction centers located at various geographical locations at a preset time, for example, 30 minutes prior to the assessment. In an embodiment, the preset time may be configurable by the system, 200. The mode of distribution may include electronic distribution through a secured network, such as a VPN network.

The system 200 may be caused to map each of the plurality of bundles with the drive data to identify corresponding bundles for respective assessment conduction center and respective candidate profiles. The mapping of the bundles with the drive data is performed so that the candidate booked for the drive can get the paper for which the candidate is registered. In an example scenario, the bundles can be uploaded to the system 200 on the day of the exam. In an embodiment, the bundles can be uploaded to the central instance database where only an entry of the bundles exam details may be made. The actual content of the question paper may still be in the local instance of the content creators/authors and in an encrypted format with the central instance. In an embodiment, the bundles or bundles of the question paper can be uploaded by the respective content creators. The encrypted question paper bundle is decrypted at the assessment conduction center on the day of the examination/assessment In an embodiment, the system 200 may be caused to facilitate printing of respective questions papers at respective assessment conduction center as per assessment schedule from the bundles for the respective assessment conduction center and the respective candidate profiles. In an embodiment, the printing of the question papers may be enabled using the machines such as machine 112-1 at the exam conduction center. In an embodiment, the candidates may have necessary credentials and access to the machine 112-1. In an embodiment, the system 200 via the machine 112-1 may enable in provisioning of a user interface, such as a graphic user interface (GUI), which may be used by the candidate for the purposes of printing the question papers. In an embodiment, the system 200 may include an assessment examination center module 232 for enabling printing of the question paper. On the day of the exam, through the assessment examination center module 232, printing can be done. It asks for printer white listed password, after authentication, the selected paper and its number of copies may be printed. The printing of question paper done through silent printing which means the user printing the paper also cannot see the paper before printing so paper cannot get leak before the exam. Also the content of the question paper is not stored in any temporary location of printer. In this way the copies of question paper can be downloaded and distributed, and till now the content of the question paper is not in central instance database. To get the content of the question paper in central instance, the bundle parsing needs to be done by providing a bundle password. In an embodiment, a user at the assessment conduction center may provide the bundle password at the machines 112 to access the content of the question papers in the bundle and/or bundle parts.

In an embodiment, the candidate registration and authentication module 228 facilitates in authenticating the candidates on the day of exam at the assessment conduction center. In an embodiment, the candidate registration and authentication module 228 may utilize the assessment metadata to authenticate the candidates. On the day of exam, candidate may get verified with the hall ticket and the attendance sheet. Additionally or alternatively, on the same day. the candidate registration and authentication module 228 may facilitate in capturing candidate finger prints, so that after the exam, in counseling, candidate can be properly authenticated. The finger prints of the candidates may be captured with the highly advanced .fpt and .fgn algorithm pattern.

In an embodiment, the system 200 may include a monitoring module 234 for monitoring the process of question paper printing and distribution. The monitoring module 234 may be configured to monitor whether or not the question paper or bundle is mapped to drive, whether content downloading in assessment conduction center is successfully completed or not, whether or not the printer is white-listed, whether or not the printing is done, and which question paper downloaded is downloaded, how many times a question paper is downloaded, number of copies of the question paper downloaded, time of printing of the question paper, and so on. Further the monitoring module 234 may facilitate in monitoring details such as the drive data including number of candidates in the drive data at any given time, and so on.

Figure 3A:
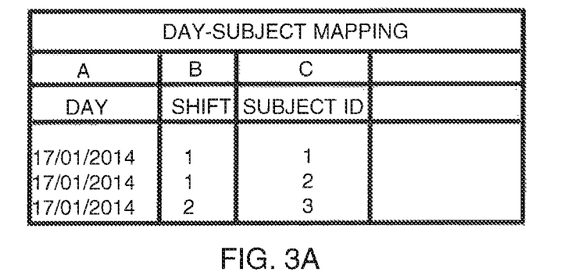
FIGS. 3A, 3B and 3C illustrate an example representation of blocking of question paper for creation of content of question papers in accordance with some embodiments of the present disclosure.
Figure 3B:
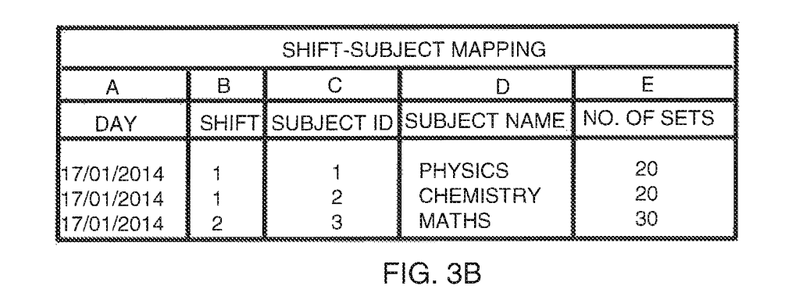
Figure 3C:
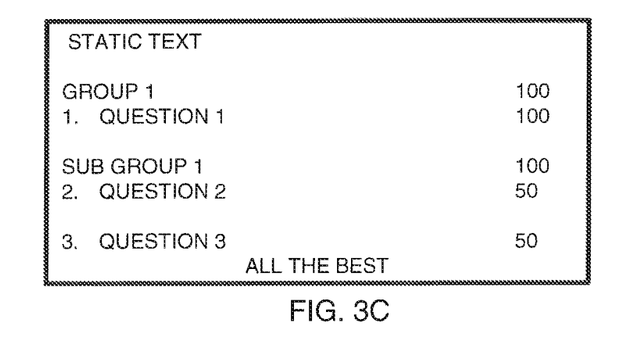

FIG. 3 illustrates an example representation for content creation, in accordance with an example embodiment. As already explained with reference to FIG. 2, there needs to create subject which appears in assessment creation module at the time of assessment creation. As user creates question papers on content creation module which is local instance, there is need to block question paper names in order to get question paper name unique. By selecting created assessment, user can block paper names either one by one or bulk upload by excel feature. After blocking question paper names, user needs to download the blocked paper name XML, which is encrypted with extension as igx. The igx file contains blocked paper name ids and its name. An example xml structure may be as follows:

```
<?xml version="1.0"?>
<Assessment id="102">
    <Subjects>
        <Subject id="1" name="S1">
            <QuestionPapersMapped>
                <QuestionPaper id="1" name="QP1"
                    userid="432554"/>
                <QuestionPaper id="2" name="QP2"
                    userid="432554"/>
            </QuestionPapersMapped>
        </Subject>
        <Subject id="2" name="S2">
            <QuestionPapersMapped>
                <QuestionPaper id="5" name="QP5"
                    userid="432554"/>
                <QuestionPaper id="6" name="QP6"
                    userid="432555"/>
            </QuestionPapersMapped>
        </Subject>
    </Subjects>
    <Languages>
        <Language id="1" name="English"/>
        <Language id="2" name="Hindi"/>
    </Languages>
</Assessment>
```

The XML file may include an assessment id, subjects in the assessment and for that subject which question papers are blocked with its unique question paper id and question paper names, allowed languages for question paper creation, user id of the content creator and so on. The user id is specified so that mapped subject user can only be the content creator for that subject question paper. In an embodiment, the content creators may be prompted to upload the plurality of bundles of question papers.

The content creators may create the question papers and the question papers are sealed. The sealed question papers can be bundled into a plurality of bundles.

Referring to FIG. 3A, the content may include day-shift mapping and shift-subject mapping for creation of bundles, in accordance with an example embodiment of the present subject matter. For instance, the day-shift mapping may include the dates of examination and corresponding shifts (e.g. morning shift, evening shifts) and number of subjects. For example, as illustrated in the FIG. 3A, corresponding to the date of 17$^{th}$ January, there are 2 shifts, and for 1$^{st}$ shift 2 subjects mapped and for 2$^{nd}$ shift only one subject are mapped. Referring to FIG. 3B, illustrating example shift-subject mapping, the subject details and number of set of question paper required for the subject are described. Using such day-shift mapping information, a plurality of bundles can be created for each day-shift. The content having the day-shift mapping and shift-subject mapping may be stored in the repository of the system 200 by the content creation module.

In an embodiment, based on the content stored, the system 200 may populate the blocked question paper names. The system 200 may further intimate the content creators for the question papers to create the content. As discussed with reference to FIG. 2, the content creators/authors may create question papers which can be on the local system/machines of respective content creators. Additionally, the system 200 may facilitate the content creators to format/update the content. In an embodiment, the content creators may format/update the text using a content editor tool and may generate the required question paper in an exact format. A format of question paper generated is illustrated with reference to FIG. 3C.

As illustrated in FIG. 3C, the question paper may include various questions. The questions are shown to be in multiple clusters/groups. For example a group 1 of the question paper may include multiple questions, such as Question 1. Similarly, a sub-group 1 of the group 1 of the question paper may include multiple questions, such as Question 2, Question 3, and so on. It is to be understood that the example cited above is only for the purpose of explanation, it should not be construed as a limitation. Structure, format, number of questions/options, and type of questions and the like may vary. For example, question paper may include multiple choice questions, multi-select questions, and comprehension/paragraph based multiple choice questions. In an embodiment, the system 200 may form the bundles of the questions papers, which can then be transmitted to the examination conduction centers. An example of creating a bundle with password generated encryption key is explained with reference to FIG. 4.

Figure 4:
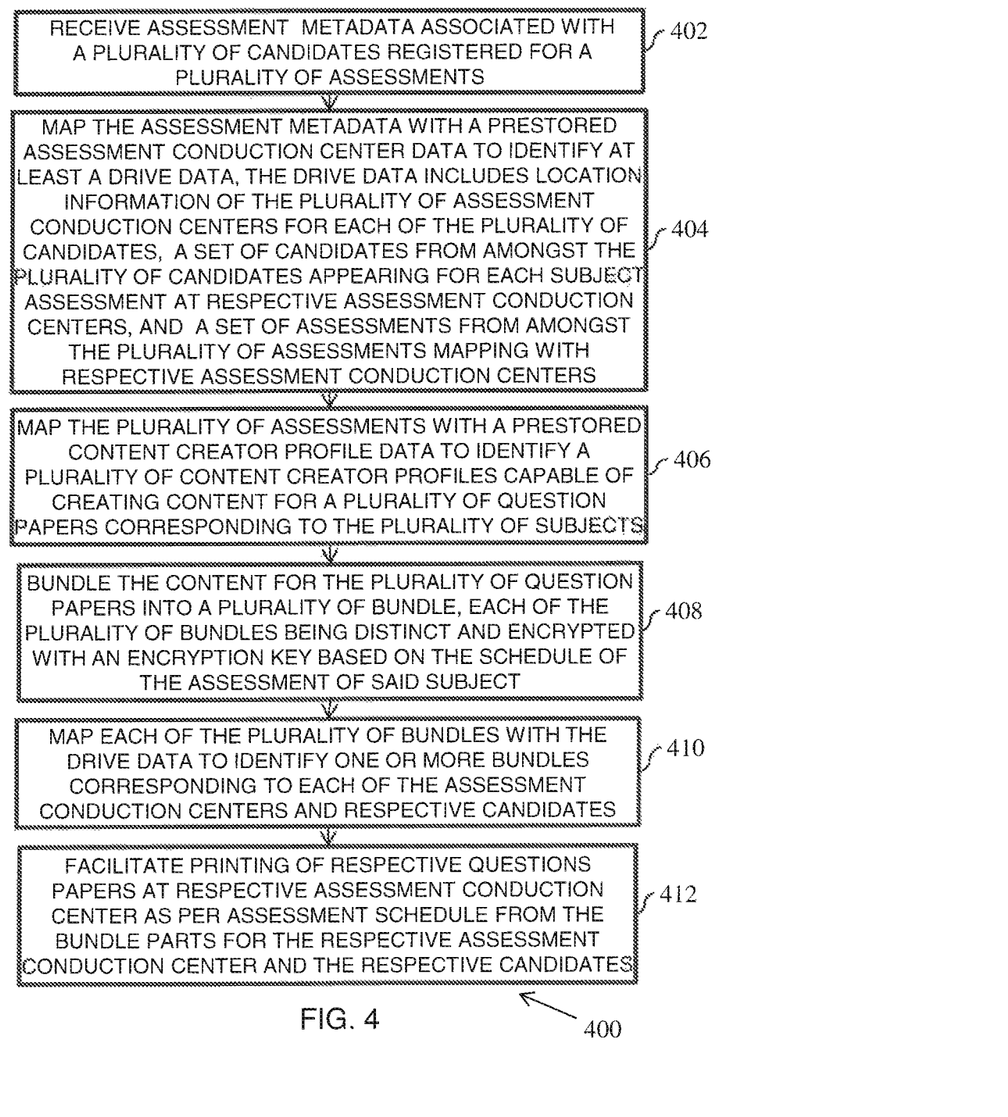
FIG. 4 is a flowchart of a method for secured computer based assessment according to some embodiments of the present disclosure.

FIG. 4 a flowchart of a method 400 for secured computer based assessment is illustrated, in accordance with an example embodiment. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof.

In an embodiment, the method 400 depicted in the flow chart may be executed by a system, for example, the system 200 of FIG. 2. In an example embodiment, the system 200 may be embodied in a computing device, for example, the computing device 104 (FIG. 1).

At 402, the method 400 includes receiving assessment metadata associated with a plurality of candidates registered for a plurality of assessments. The assessment metadata may include candidate attributes, schedule information, and a first plurality of assessment conduction center attributes associated with the plurality of assessments.

At 404, the method 400 includes mapping the assessment metadata with a prestored assessment conduction center data to identify at least a drive data. In an embodiment, the assessment conduction center data may be prestored in the assessment administering system (for example the system 200 of FIG. 2). The assessment conduction center data may include a second plurality of assessment conduction center attributes associated with each of a plurality of assessment conduction centers. In an embodiment, the drive data may include an assessment conduction center location associated with each of the plurality of candidates, and a count of the plurality of candidates appearing for each subject assessment at respective assessment conduction centers and a plurality of subjects mapping with said respective assessment conduction centers. In one implementation, the assessment management module 222 maps the assessment metadata with the prestored assessment conduction center data to identify the drive data.

At 406, the method 400 includes mapping the plurality of assessments with a prestored content creator profile data to identify a plurality of content creator profiles capable of creating content for a plurality of question papers corresponding to the plurality of subjects. In an embodiment, the content creator profile data may be prestored at the processor-based exam administering system 200. In one implementation, the content creation module 222 maps the plurality of subjects with a prestored content creator profile data to identify a plurality of content creator profiles.

At 408, the method 400 includes bundling the content for the plurality of question papers into a plurality of bundles, such that each bundle is distinct and encrypted with an encryption key based on the schedule of the assessment of said subject. In one implementation, the bundle mapping module 226 bundles the content for the plurality of question papers into the plurality of bundles.

At 410, the method 400 includes mapping each of the plurality of bundles with the drive data to identify corresponding bundles for respective assessment conduction center and respective candidate profiles. At 412, the method 400 includes facilitating printing of respective questions papers at respective assessment conduction center as per assessment schedule from the bundles for the respective assessment conduction center and the respective candidate profiles. In one implementation, the bundle mapping module 226 maps each of the plurality of bundles with the drive data to identify corresponding bundles for respective assessment conduction center and respective candidate profiles A significant outcome of the disclosed method is that the method enables advanced registration and authentication of candidate by providing an assessment assistance system. The assessment assistance system enables highly secured question paper creation, distribution and printing. Additionally, the assessment assistance system precludes the need of manually managing various processing of managing the process of examination, thereby eliminating occurrence of any problem that could have happened due to manual interference, such as mistakes/errors in candidate profile data such as wring candidate names, improper test center addresses, confusion in addresses, improper question paper content. A major advantage of the disclosed system is that the system automatically provides exact data as per the candidate's registration information (retrieved from the candidate's form filled by the candidate), and according to candidate's location, the system automatically allots a nearest assessment conduction center to the candidate. In accordance, the system allows for advanced candidate booking and slot booking with the help of Assessment Management module, creation of highly secured question paper using Content creation module, mapping of question papers to assessment with assessment management module, candidate registration and authentication with biometrics, secured paper printing and distribution with assessment conduction center, and bird's view on this process by monitoring module. In this way the assessment conducted can be highly secured and error-free.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for administering a secured assessment by an assessment assistance system, the method comprising:
receiving assessment metadata associated with a plurality of candidates registered for a plurality of assessments, via one or more hardware processors, the assessment metadata comprising candidate attributes, schedule information, and a first plurality of assessment conduction center attributes associated with the plurality of assessments;
mapping, via the one or more hardware processors, the assessment metadata with a pre-stored assessment conduction center data to identify at least a drive data, the pre-stored assessment conduction center data comprising a second plurality of assessment conduction centers attributes associated with a plurality of assessment conduction centers, the drive data comprising:
location information of the plurality of assessment conduction centers for each of the plurality of candidates;
at least one candidate from amongst the plurality of candidates appearing for at least one subject assessment at the plurality of assessment conduction centers; and mapping, via the one or more hardware processors, the plurality of assessments with a pre-stored content creator profile data to identify a plurality of content creator profiles capable of creating content for a plurality of question papers corresponding to the plurality of assessments, wherein the content creator profile data include content creator specialization, total level of experience, a rating associated with the content creator and a language preference of the content creator, wherein each of the plurality of assessments and each of the identified plurality of content creator profiles is assigned with an assessment id and a user id respectively, and wherein a mapped user id corresponds to the content creator for a subject question paper and wherein the subject question paper is blocked with a unique question paper id;

bundling, via the one or more hardware processors, the content of a plurality of question papers into a plurality of bundles based on day-shift mapping and shift-subject mapping, each bundle of the plurality of bundles being distinct and encrypted with an encryption key generated based on a schedule of the subject assessment, wherein the each bundle of the plurality of bundles is password protected;

mapping, via the one or more hardware processors, the plurality of bundles with the drive data to identify one or more bundles from amongst the plurality of bundles corresponding to each of the plurality of assessment conduction centers and the plurality of candidates; and facilitating, via the one or more hardware processors, printing of the plurality of questions papers from the plurality of bundles at the respective assessment conduction centers as per assessment schedule for the respective assessment conduction center and the respective candidates of the plurality of candidates.

2. The processor-implemented method of claim 1, further comprising identifying slot booking details for each candidate of the plurality of candidates corresponding to each assessment, the slot booking details indicative of the assessment conduction center corresponding to each candidate, a corresponding assessment subject and a corresponding assessment schedule.

3. The processor-implemented method of claim 1, wherein the assessment assistance center and the plurality of assessment conduction centers are connected over a secured network.

4. The processor-implemented method of claim 3, wherein the secured network is a Virtual Private Network (VPN).

5. The processor-implemented method of claim 1, further comprises decrypting the bundle at a preset time as per the assessment schedule prior to printing the question papers.

6. The processor-implemented method of claim 1, further comprising determining hall ticket data based on the mapping of the assessment metadata with the assessment conduction center data, the hall ticket data comprising at least candidate information and assessment information.

7. The processor-implemented method of claim 1, further comprises:
identifying, based on candidate profile data, the plurality of assessments for which the plurality of question papers are to be generated;
assigning respective identifiers to each of the plurality of assessments; and
providing the respective identifiers to the plurality of content creator profiles for creating content for the plurality of question papers.

8. A processor-implemented system for administering a secured assessment, the system comprising:
one or more memories storing instructions; and
one or more hardware processors coupled to the one or more memories, wherein the one or more hardware processors are configured by the instructions to:
receive an assessment metadata associated with a plurality of candidates registered for a plurality of assessments, the assessment metadata comprising candidate attributes, schedule information, and a first plurality of assessment conduction center attributes associated with the plurality of assessments;
map the assessment metadata with a pre-stored assessment conduction center data to identify at least a drive data, the pre-stored assessment conduction center data comprising a second plurality of assessment conduction centers attributes associated with a plurality of assessment conduction centers, the drive data comprising:
location information of the plurality of assessment conduction centers for each of the plurality of candidates;
at least one candidate from amongst the plurality of candidates appearing for at least one subject assessment at the plurality of assessment conduction centers; and
map the plurality of assessments with a pre-stored content creator profile data to identify a plurality of content creator profiles capable of creating content for a plurality of question papers corresponding to the plurality of assessments, wherein the content creator profile data include content creator specialization, total level of experience, a rating associated with the content creator and a language preference of the content creator, wherein each of the plurality of assessments and each of the identified plurality of content creator profiles is assigned with an assessment id and a user id respectively, and wherein a mapped user id corresponds to the content creator for a subject question paper and wherein the subject question paper is blocked with a unique question paper id;
bundle the content for the plurality of question papers into a plurality of bundles based on day-shift mapping and shift-subject mapping, each bundle of the plurality of bundles being distinct and encrypted with an encryption key generated based on a schedule of the subject assessment, wherein the each bundle of the plurality of bundles is password protected;
map the plurality of bundles with the drive data to identify one or more bundles from amongst the plurality of bundles corresponding to each of the plurality of assessment conduction centers and the plurality of candidates; and
facilitate printing of the plurality of questions papers from the plurality of bundles at the respective assessment conduction centers as per assessment schedule for the respective assessment conduction center and the respective candidates of the plurality of candidates.

9. The processor-implemented system of claim 8, wherein the one or more hardware processors are further configured by the instructions to identify slot booking details for each candidate of the plurality of candidates corresponding to each assessment, the slot booking details indicative of the assessment conduction center corresponding to each candidate, a corresponding assessment subject and a corresponding assessment schedule.

10. The processor-implemented system of claim 8, wherein the assessment assistance center and the plurality of assessment conduction centers are connected over a secured network.

11. The processor-implemented system of claim 10, wherein the secured network is a Virtual Private Network (VPN).

12. The processor-implemented system of claim 8, wherein the one or more hardware processors are further configured by the instructions to further decrypt the bundle parts at a preset time as per the assessment schedule prior to printing the question papers.

13. The processor-implemented system of claim 8, wherein the one or more hardware processors are further configured by the instructions to determine hall ticket data based on the mapping of the assessment metadata with the assessment conduction center data, the hall ticket data comprising at least respective candidate information and respective assessment information.

14. The processor-implemented system of claim 8, wherein the one or more hardware processors are further configured by the instructions to:
   identify, based on the candidate profile data, a plurality of assessments for which the question papers are to be generated;
   assign respective identifiers to each of the plurality of assessments; and
   provide the respective identifiers to the plurality of content creator profiles for creating content for the plurality of question papers.

15. A non-transitory computer-readable medium having embodied thereon a computer program for executing a method for administering a secured assessment by an assessment assistance system, the method comprising:
   receiving assessment metadata associated with a plurality of candidates registered for a plurality of assessments, the assessment metadata comprising candidate attributes, schedule information, and a first plurality of assessment conduction center attributes associated with the plurality of assessments;
   mapping the assessment metadata with a pre-stored assessment conduction center data to identify at least a drive data, the pre-stored assessment conduction center data comprising a second plurality of assessment conduction centers attributes associated with a plurality of assessment conduction centers, the drive data comprising:
      location information of the plurality of assessment conduction centers for each of the plurality of candidates;
      at least one candidate from amongst the plurality of candidates appearing for at least one subject assessment at the plurality of assessment conduction centers; and
   mapping the plurality of assessments with a pre-stored content creator profile data to identify a plurality of content creator profiles capable of creating content for a plurality of question papers corresponding to the plurality of assessments, wherein the content creator profile data include content creator specialization, total level of experience, a rating associated with the content creator and a language preference of the content creator, wherein each of the plurality of assessments and each of the identified plurality of content creator profiles is assigned with an assessment id and a user id respectively, and wherein a mapped user id corresponds to the content creator for a subject question paper and wherein the subject question paper is blocked with a unique question paper id;
   bundling the content of a plurality of question papers into a plurality of bundles based on day-shift mapping and shift-subject mapping, each bundle of the plurality of bundles being distinct and encrypted with an encryption key generated based on a schedule of the subject assessment, wherein the each bundle of the plurality of bundles is password protected;
   mapping the plurality of bundles with the drive data to identify one or more bundles from amongst the plurality of bundles corresponding to each of the plurality of assessment conduction centers and the plurality of candidates; and
   facilitating printing of the plurality of questions papers from the plurality of bundles at the respective assessment conduction centers as per assessment schedule for the respective assessment conduction center and the respective candidates of the plurality of candidates.

* * * * *